(12) United States Patent
Maleki et al.

(10) Patent No.: US 8,318,355 B2
(45) Date of Patent: Nov. 27, 2012

(54) CARBON-CARBON COMPOSITE PARTICLES, THEIR PREPARATION AND USE THEREFORE AS NEGATIVE ELECTRODE FOR LI-ION BATTERIES

(75) Inventors: Hossein Maleki, Lawrenceville, GA (US); Robert J. Selman, Chicago, IL (US); Abdelbast Guerfi, Brossard (CA); Elisabeth Dupuis, McMasterville (CA); Karim Zaghib, Longueuil (CA)

(73) Assignee: Hydro-Quebec, Montreal, Quebec (CA)

( * ) Notice: Subject to any disclaimer, the term of this patent is extended or adjusted under 35 U.S.C. 154(b) by 1243 days.

(21) Appl. No.: 10/497,859

(22) PCT Filed: Dec. 6, 2002

(86) PCT No.: PCT/CA02/01888
§ 371 (c)(1),
(2), (4) Date: Apr. 13, 2005

(87) PCT Pub. No.: WO03/049215
PCT Pub. Date: Jun. 12, 2003

(65) Prior Publication Data
US 2005/0203240 A1    Sep. 15, 2005

(30) Foreign Application Priority Data
Dec. 7, 2001    (CA) .................................... 2364651

(51) Int. Cl.
*H01M 4/58* (2010.01)
*H01M 4/13* (2010.01)
*H01M 4/88* (2006.01)
*H01B 1/04* (2006.01)
*C08K 3/04* (2006.01)

(52) U.S. Cl. .................. 429/231.8; 429/217; 252/182.1; 252/502; 524/495

(58) Field of Classification Search ............... 429/231.8, 429/217; 524/495; 252/182.1, 502
See application file for complete search history.

(56) References Cited

U.S. PATENT DOCUMENTS

| | | | | |
|---|---|---|---|---|
| 5,908,715 A | * | 6/1999 | Liu et al. | 429/217 |
| 6,027,833 A | * | 2/2000 | Ueda et al. | 429/218.1 |

(Continued)

FOREIGN PATENT DOCUMENTS

EP    0 782 207 A1    7/1997

(Continued)

OTHER PUBLICATIONS

Office Action issued Oct. 24, 2008 in JP appln No. 2003-550303, 6 pages, English translation.

(Continued)

*Primary Examiner* — Karie O'Neill Apicella
(74) *Attorney, Agent, or Firm* — Buchanan Ingersoll & Rooney

(57) ABSTRACT

A composite of particles comprising a high crystallinity carbon and a low crystallinity carbon, wherein the low crystallinity carbon exhibits an average lattice constant d=(002) of 0.350 nm or more and a crystallite size L=(002) in the diffraction of C axis of 25 nm or less, as characterized by wide-angle X ray diffraction measurements, the high crystallinity carbon exhibits an average lattice constant d=(002) of 0.338 nm or less and a crystallinity size L=(002) in the diffraction of C axis of 40 nm or more, as characterized by wide-angle X-ray diffraction measurements, the high crystallinity carbon having at least 50% of its external surface embedded within or surrounded by a matrix of low crystallinity carbon.

9 Claims, 8 Drawing Sheets

U.S. PATENT DOCUMENTS

| | | | |
|---|---|---|---|
| 6,139,989 | A | 10/2000 | Kawakubo et al. |
| 6,295,428 | B1 * | 9/2001 | Suzuki ............................ 399/168 |
| 2002/0061445 | A1 | 5/2002 | Kitagawa et al. |

FOREIGN PATENT DOCUMENTS

| | | |
|---|---|---|
| JP | 10-149830 | 6/1998 |
| JP | A-10-149830 | 6/1998 |
| JP | A-10-162858 | 6/1998 |
| JP | 11-031511 | 2/1999 |
| JP | A-11-031511 | 2/1999 |
| JP | 11-339806 | 12/1999 |
| JP | A-11-339806 | 12/1999 |
| JP | 0 977 292 A2 | 2/2000 |
| JP | 2000-123826 | 4/2000 |
| JP | A-2000-123826 | 4/2000 |
| JP | 2O01-185147 | 7/2001 |
| JP | 2001-202961 | 7/2001 |
| JP | A-2001-185147 | 7/2001 |
| JP | A-2001-202961 | 7/2001 |
| JP | 2003-173778 | 6/2003 |
| JP | A-2003-173778 | 6/2003 |

OTHER PUBLICATIONS

International Search Report.

Nishi, "Advances in Lithium-Ion Batteries", edited by W. Schalkwijk Cluwer Academic / Plenum Publishers, 2002, p. 233.

A. Webber and G. Blomgren, "Advances in Lithium-Ion Batteries", edited by W. Schalkwijik Cluwer Academic / Plenum Publishers, 2002, p. 185.

R. Huggins, "Handbook of Battery Materials", edited by J. O. Besenhard, Wiley-VCH, 1999, p. 359.

K. Kinoshita, "Carbon Electrochemical and Physicochemical Properties", edited by J. Wiley, New York, 1988, pp. 1-21.

Office Action issued in EP Application No. 02 782 580.1 on Sep. 11, 2011.

J.N. Rouzaud and A. Oberlin, "Structure, Microtexture, and Optical Properties of Anthracene and Saccharose-based Carbons," *Carbon*, vol. 27, No. 4, pp. 517-529 (1989).

* cited by examiner

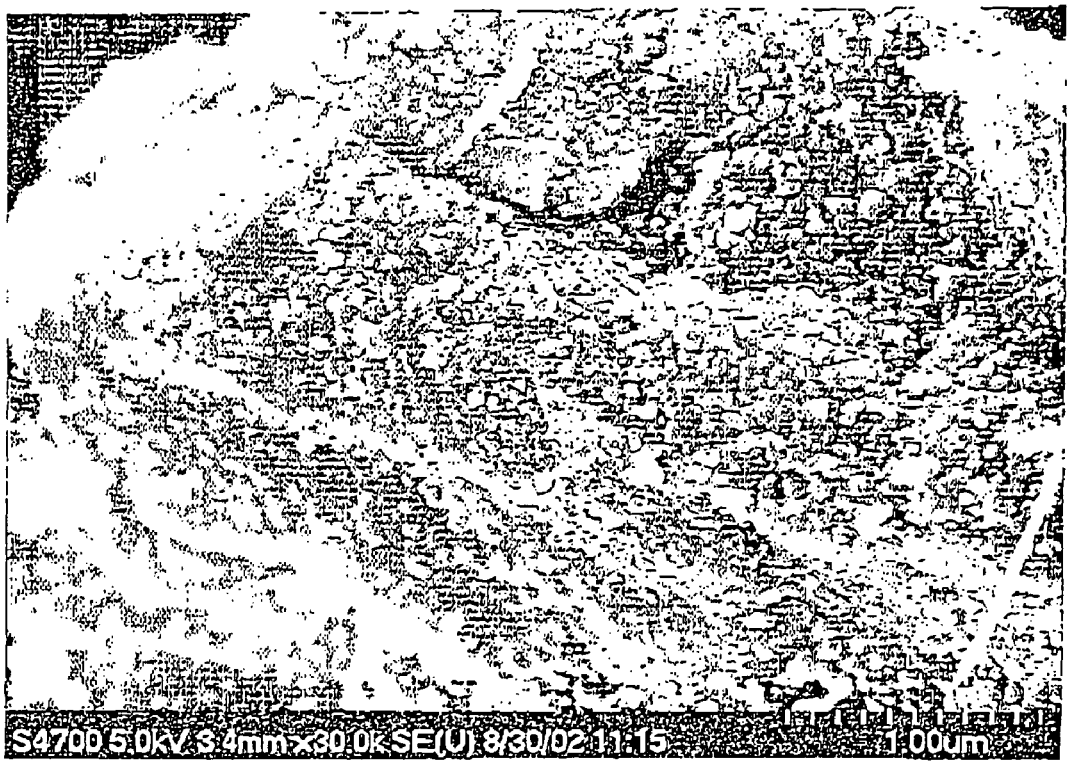
FIG_3A
FIG_3B

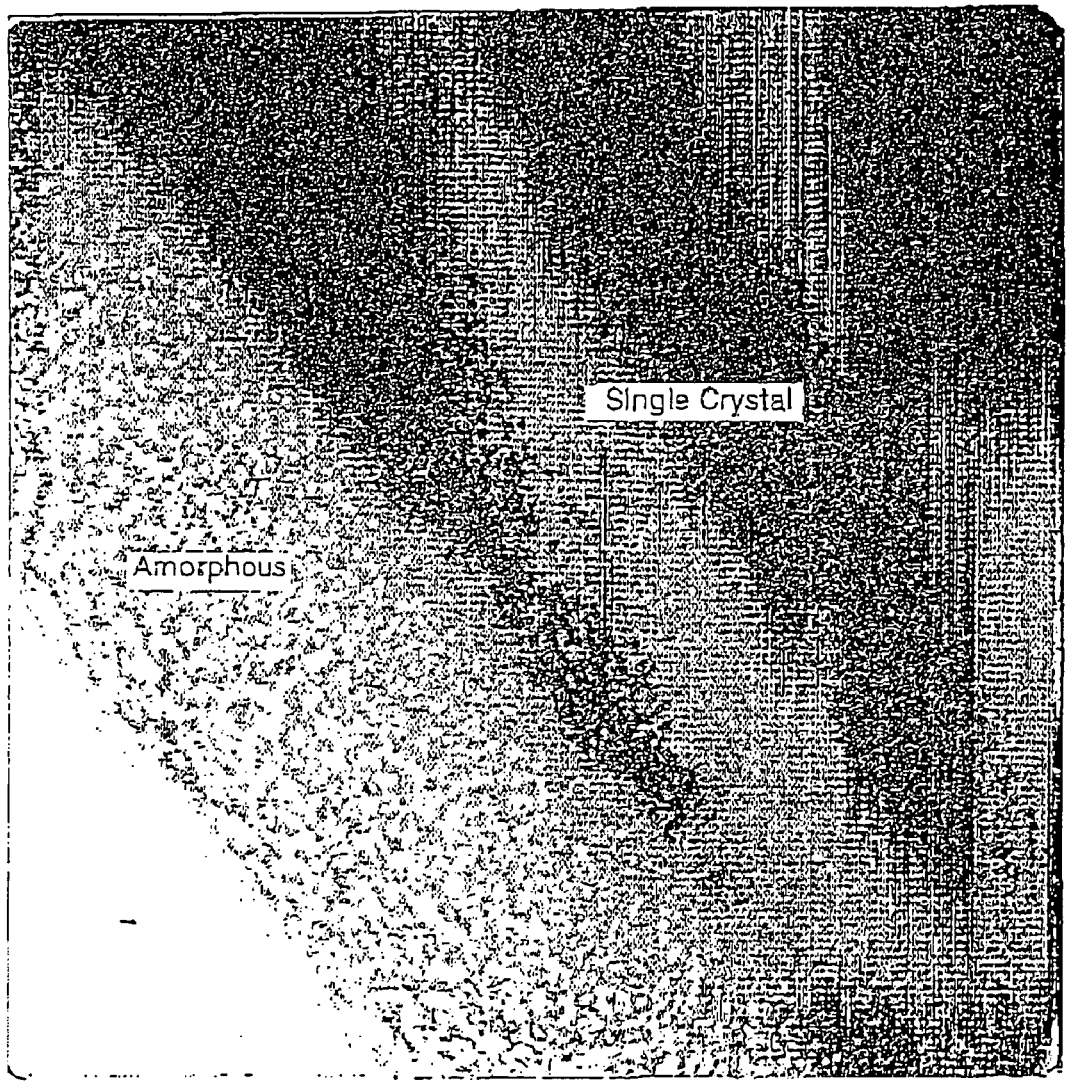

CARBON-CARBON COMPOSITE PARTICLES, THEIR PREPARATION AND USE THEREFORE AS NEGATIVE ELECTRODE FOR LI-ION BATTERIES

TECHNICAL FIELD

The present invention relates to composite carbon-carbon particles obtained from a low crystallinity carbon and of a high crystallinity carbon.

The present invention also relates to a process for preparing the composite carbon-carbon particles of the invention by dispersing and mixing together low crystallinity carbon particles with high crystallinity carbon particles.

The present invention also relates to a process for preparing the composite carbon-carbon particles of the invention by mixing carbon particles with a polymeric substance and by heating the mixture thereby obtained until carbonization of the polymeric substance on the surface of the carbon particles A further aspect of the present invention is the use of the composite particles inter alia in the foundry industry, in sports equipment, in the automobile and in aeronautic industries and the use of those particles as constituents of electrode material in electrochemical systems.

PRIOR ART

Li-ion batteries are now considered one of the best existing power sources for portable electronics such as cell-phones, camcorders, laptop computer and power tools. A Li-ion cell typically consists of a carbon-based negative electrode (NE), a porous polymer membrane separator (polypropylene and/or polyethylene) and a lithium transition metal oxide ($LiMO_2$, M=Co, Ni, or Mn) based positive electrode as described in Nishi in Advances in Lithium-ion batteries edited by W. Schalkwijik Cluwer Academic/plenum publishers, 2002, page 233, electrodes are made by casting slurries of active materials, polymer-based binder (i.e. polyvinylidene difluoride, PVDF) and small amounts of high surface area carbon onto metal foil current collectors. Mixtures of Li-salts and organic solvents provide an electrolyte medium for Li-ions to shuttle between the PE and NE. During charge, Li-ions deintercalate from the PE and intercalate into the NE, while the reverse takes place during discharge as mentioned in A. Webber and G. Blomgren in Advances in Lithium-ion batteries, edited by W. Schalkwijik Cluwer Academic/plenum publishers, 2002, on page 185.

The evolving products require a Li-ion cell with a longer cycle-life, higher energy and charge/discharge rate capabilities. Long cycle-life e.g. is critical for the Li-ion battery to last the lifetime of the host device (such as: embedded electronics and medical prosthesis); and high capacity and rate capability are needed for the EV, aerospace and military applications.

For the development of Li-ions of such unique properties, battery manufacturers and research groups have been investigating possible applications of new and/or modified PE and NE materials.

These included utilization of In/Si-based intermetallic alloys, metal-carbon and carbon-carbon composites as NE-materials, and mixed metal-oxides as PE-material, as disclosed in R. Huggins in Handbook of battery materials edited by J. Besenhard Wiley-veh, 1999, page 359.

However, despite their high capacity, available NE-materials containing carbon-carbon composite, present the drawback of limited cyclic life, when available NE-materials containing In/Si-based intermetallic alloys despite their capacity present the drawback to be used commercial lithium-ion batteries.

Electrodes are made by casting slurries of active materials, polymer-based binder (i.e. polyvinylidene difluoride, PVDF) and small amounts of high surface area carbon onto metal foil current collectors. Mixtures of Li-salts and organic solvents provide an electrolyte medium for Li-ions to shuttle between the PE and NE. During charge, Li-ions deintercalate from the PE and intercalate into the NE, while the reverse takes place during discharge.

The evolving products are demanding for Li-ion cells with longer cycle-life, higher energy and charge/discharge rate capabilities. Long cycle-life e.g. is critical if the Li-ion battery should last the lifetime of the host device (such as: embedded electronics and medical prosthesis); and high capacity and rate capability are needed for the EV, aerospace and military applications.

For the development of Li-ions of such unique properties, battery manufactures and research groups have investigating possible application of new and/or modified PE and NE materials, including the utilization of In/Si-based inter-metallic alloys, metal-carbon and carbon-carbon composites as NE-materials, and mixed metal-oxides as PE-material.

However, despite their high capacity, available NE-materials containing carbon-carbon composite present the drawback of cyclic life, when available NE-materials containing In/Si-based intermetallic alloys despite their capacity present the drawback to be used commercial lithium-ion batteries.

There was therefore a need for a positive electrode and/or negative electrode material free of the drawbacks usually associated with the corresponding prior art known materials and presenting inter alia at least one of the following properties: a long cycle life, a high capacity, a low self discharge, a good compatibility with a low volume expansion and with a low reactivity required for the safety of batteries.

BRIEF DESCRIPTION OF THE FIGURES

FIG. 3A is the SEM image of the carbon-carbon material according to sample 1 hereinafter defined in Table I, carbon#1 is derived from carbonization of PF, which cover partially the surface of carbon#2 (graphite).

FIG. 3B is the same SEM image as in FIG. 3A, but at a larger scale.

FIG. 7 shows Transmission Electron Micrograph a carbon-carbon composite according to the invention, that has been prepared according to samples 3 and 4 and beat treated to 2,500° C.

DESCRIPTION OF THE INVENTION

Figure 1:
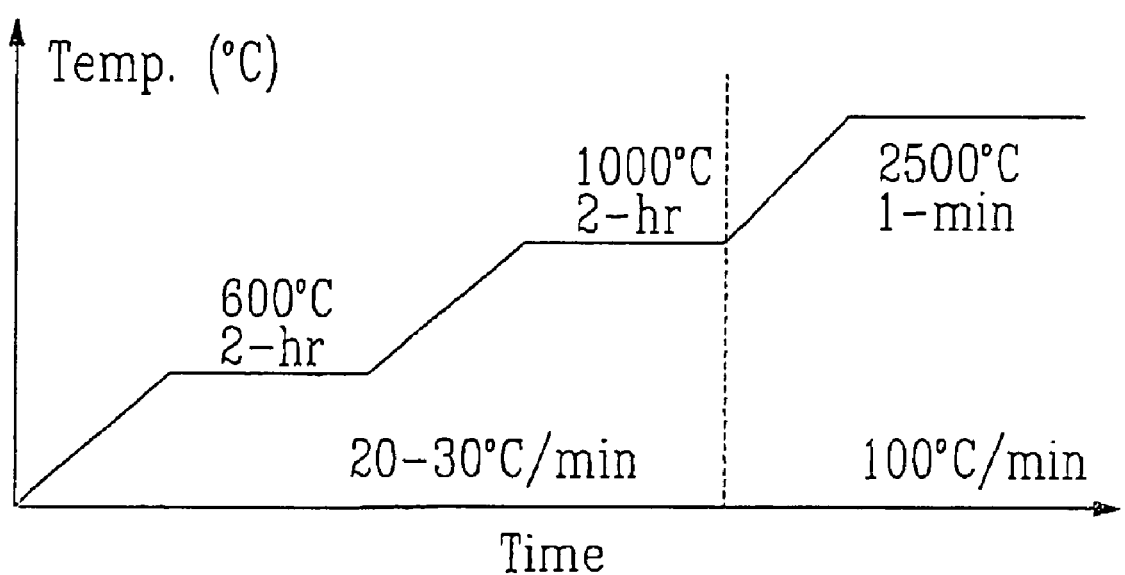
FIG. 1 is a graph that represents the thermal profile of the heat treatment of a (Carbon#2: polymerized PF-matrix) prepared according to a process of the invention as described thereafter under "sample preparation".
Figure 2A:
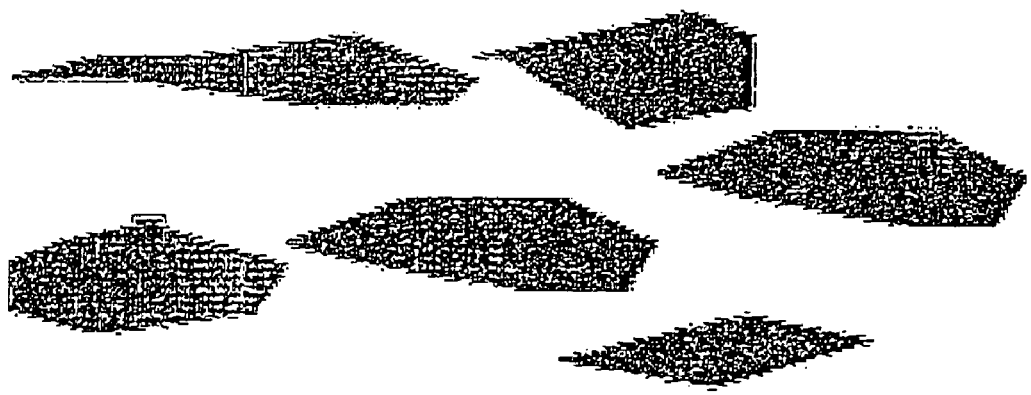
FIGS. 2a to 2d are schematic pictorial model representations of the steps occurring during processing of the proposed carbon-carbon composite material for NE in Li-ion cells, in the case wherein carbon#1 progressively covers carbon#2 particles with a network of carbon#1.
Figure 2B:
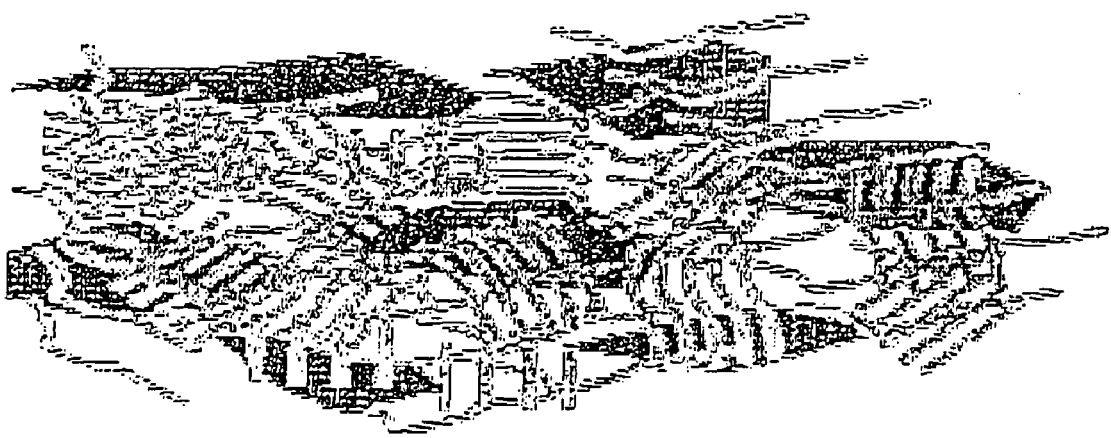
Figure 2C:
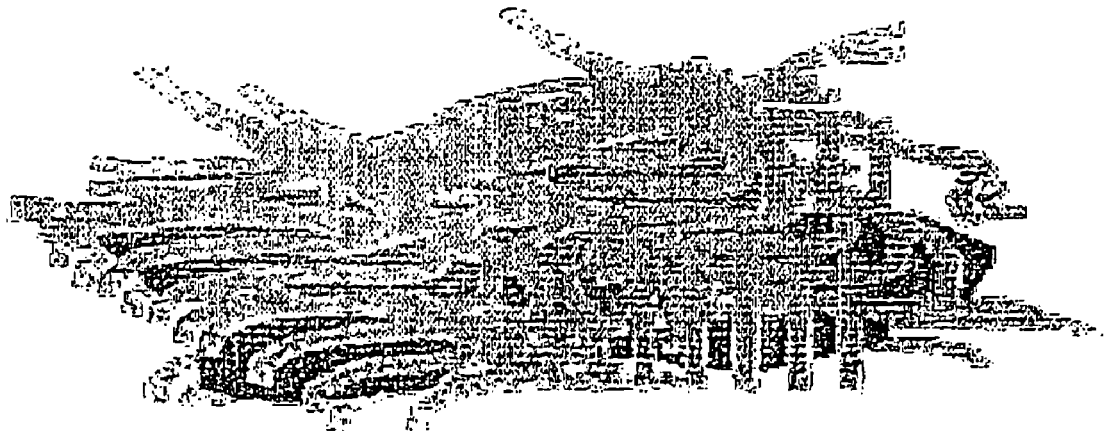
Figure 2D:
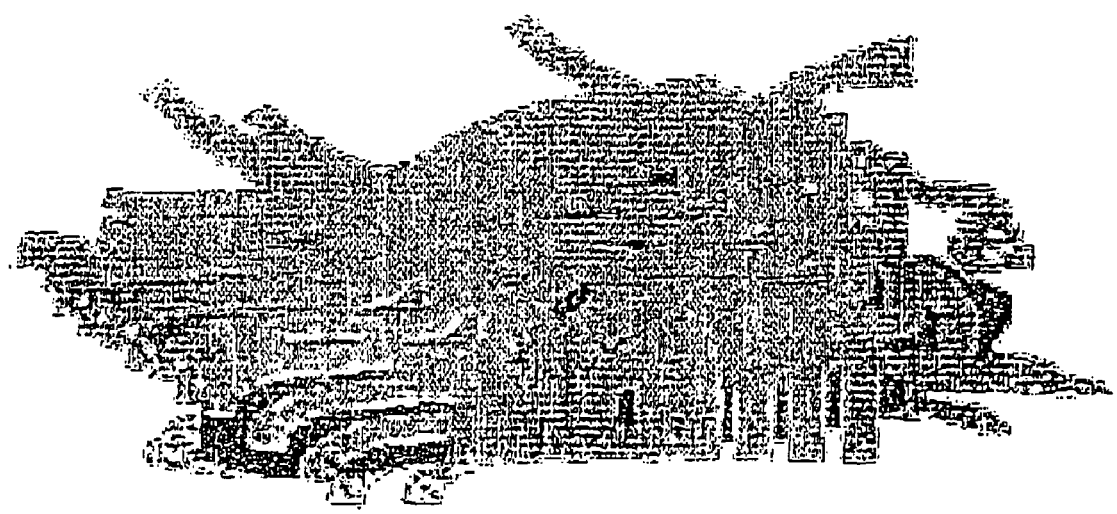

A first object of the present invention is constituted by composite particles of carbon, thereafter named Carbon#1-Carbon#2 composite particles, wherein Carbon#1 means a low crystallinity carbon and Carbon#2 means a high crystallinity carbon.

In the framework of the present invention, the expression Carbon#1 means carbon particles, having a low crystallinity characterized by wide-angle X ray diffraction measurements, i.e by an average lattice constant d=(002) of 0.350 nm or more and a crystallite size L=(002) in the direction of C axis of 25 nm or less. Such low crystallinity carbon is more extensively described in Carbon electrochemical and physicochemical properties, John Wiley, New York, 1988.

According to a preferred embodiment of the invention low crystallinity carbons are selected in the group constituted by hard carbon, glassy carbons, polymer derived carbons and petroleum cokes.

In the framework of the present invention, the expression Carbon#2 means a high crystallinity carbon characterized by wide-angle X ray diffraction measurements, i.e by an average lattice constant d=(002) of 0.338 nm or less and a crystallinity size L=(002) in the direction of C axis of 40 nm or more. Such high crystallinity carbon is more extensively defined in Carbon electrochemical and physicochemical properties, John Wiley, New York, 1988. According to a preferred embodiment of the invention such high crystallinity carbon is selected in the group constituted by graphite, preferably natural graphites, kish graphite, pyrolytic graphite, gas-growth graphite or any artificial graphite.

A preferred family of Carbon#1-Carbon#2 composite particles of the invention is constituted by those composite particles having at least one of the following physical properties:
- a package density, according to the tap density method associated to the apparatus commercialized under the name Logan Instrument Corp. Model Tap-2, that is >0.5 g/cc.
- a particle size, measured according to the SEM method associated with apparatus Microtac model X100 Particle Analyser, ranges from 0.5 to 100 micrometers; and
- a specific surface area, measured according to the BET method, ranging from 1 to 50 $m^2/g$.

As shown inter alia in FIG. 2, the composite particles of the invention may be described as particles of Carbon#2 embedded or surrounded by a matrix (or a network) of Carbon#1.

Therefore, particles of a high crystallinity carbon (preferably a graphitic carbon) are embedded within or surrounded by the matrix of a second carbon that has lower degree of crystallinity (graphitization), also known as hard carbon.

A second object of the present invention is constituted by the use of the composite particles according to the first object of the present invention as a constituent of an electrode material, preferably as a constituent of a N-E (negative electrode) material in electrochemical systems, in the foundry industry, in the car and in aeronautic industries, in sports equipment.

A third object of the present invention is constituted by negative electrodes comprising between 2 to 98% and preferably by those comprising at least 90 weight per cent of a composite particles of the invention, the remaining being preferably constituted by at least one binder. The binder is preferably of the PVDF type.

A fourth object of the present invention is constituted by a battery system comprising at least one electrode containing carbon-carbon composite particles according the invention. Preferably, in the battery system of the invention, the electrode containing composite particles is a negative electrode.

According to an another embodiment, the battery system is of the N-E/electrolyte/PE type.

According to a further preferred embodiment of the invention the battery system consists, of winded/stacked layers or of winded/stacked layers of electrodes of electrodes, at least one of said electrodes comprising carbon-carbon composite particles according to the invention.

A preferred embodiment is constituted by Li-ion battery comprising a negative electrode, a positive electrode and a porous polymer membrane separator for example of the Celguard type, wherein at least one of said electrodes is a negative electrode according to the invention.

A fifth object of the present invention is constituted by a process for preparing the composite material particles according to the first object of the invention. This process preferably comprises the steps of dispersing and mixing preferably by using ball milling, at least one Carbon#1 powder, preferably in the form of a slurry of a polymeric substance that results in carbon particles by heat treatment. The polymeric substances preferably a polymer with a high carbon content, is preferably dispersed in an organic solvent in a slurry that can easily stick on the surface of the carbon particles to be covered. The polymeric material is preferably dispersed in a liquid Phenolic Resin (PF). Appropriate phenolic resins are for example those commonly used in the foundry industry. Phenolic resins are the most widely used resin binders in the foundry industry. They are produced by polycondensation of phenols with formaldehyde. The three types of resins presented in the following Table differ in catalyst and mole ratio of reactants used in their preparation. Furthermore, they have different molecular structures and reactivities and require different curing agents.

There are two further categories of epoxy resins that may be successfully used, namely the glycidyl epoxy, and non-glycidyl epoxy resins. The glycidyl epoxies are further classified as glycidyl-ether, glycidyl-ester and glycidyl-amine.

The diglycidyl ether of bisphenol-A (DGEBA) is a typical commercial epoxy resin and is synthesised by reacting bisphenol-A with epichlorohydrin in presence of a basic catalyst.

The Novolac Epoxy Resins are glycidyl ethers of phlenolic novolac resins.

The mixing process is advantageously continued until complete dispersion of Carbon#2 in the PF and preferably until vaporization of 40 to 60 wt % of the containing solvent (preferably water, or organic solvent such as an alcohol) from PF. Among preferred solvent for preparing the PF dispersions are water and organic solvents such as alcohols.

The heat treatment is preferably carried out at a temperature ranging from 400 to 2,800° Celsius, and more preferably at a temperature ranging from 1,000 to 2,500° C.

A sixth object of the present invention is constituted by a process for preparing a negative electrode. This process comprises the steps of:
a) dispersing and mixing, preferably by using ball milling, at least one Carbon#1 powder, in preferably a liquid Phenolic Resin (PF), the mixing process being preferably continued until complete dispersion of carbon#2 in the PF and preferably until vaporization of 40 to 60 wt % of the containing solvent (preferably water, or organic solvent such as an alcohol) from the PF;
b) pouring the mixture obtained in the preceding step on a support, preferably on a flat Al-plate, on a Cu-plate, on an alu-Exmet or on a cupfer Exmet, then heated preferably to 150-175° C., more preferably to 160-170° C. and thermally soaked, for 1 to 5 hours, preferably for about 2.0 hours, the heating rate varying preferably from 3-8° C/min depending on the thickness of the sample;
c) after the preceding heating step, preferably converting the sample into solid sheets from which the support (AL-plate was separated); and
d) treating the Carbon#2: polymerized PF-matrix obtained in the preceding step at a temperature ranging from 600 to 2.500° C., preferably at a temperature ranging from 600 to 1.000° C. using 30-50° C/min heating rate following thermal profile shown in FIG. 1. Then the carbon#1 is produced by carbonization of PF-matrix.

Any polymeric material, particularly any polymeric material with a high carbon content and more preferably any PF transforms to graphite up to beating through the following process:
1. PF Polymerizes to a rubbery gel on heating to 85° C. (gelling process);
2. on heating to 120° C., the rubbery gel cures to form a hard cross-linked polymer by condensation reaction which produces water;
3. on heating to 225° C., the hard cross-linked polymer obtained in step 2 forms yellowish transparent material with lower density that its previous stages, this coincides with loss of more water and material having high porosity, at this stage neighboring carbon chains merge and start forming 3D-carbon matrixes;
4. on heating to from 225° C. to 500° C., the material obtained in the preceding step becomes free of water and yet contains appreciable amounts of hydrogen, this step is know as pre-carbonization carbonization step which was critical in controlling the porosity of the host material. Slower heating leads to smaller pore sizes;
5. on heating to 1000-1250° C., material volume shrinks, its electrical conductivity increases by many orders of magnitudes;
6. at temperatures above 1200° C., the material being depleted of hydrogen; and
7. further cross-linking and carbon chains starts growing in 2D & 3D directions, this means that carbon#2 sticks on the surface of the carbon#2 particles and carbon#1 squeezes into itself with the temperature is increased to 2.500° C., In the following examples, the PF material used was supplied in the year 2001 by Georgia Pacific Co., Lawrenceville, Ga., in the United States of America under the reference Products # PF211.

Here, we are proposing the application of a new Carbon#1-Carbon#2 composite as N-E material for battery systems consisted of winded/stacked layers of electrodes with potential differences between them being dependant on their electrochemical properties. The other disclosing element of this proposal is the processing of the carbon-carbon composites noted above. The proposed material consists of carbon-carbon composite of 10-100 μm particles.

This consisted of a highly graphitic carbon (e.g. graphite) embedded within or surrounded by the matrix of a second carbon that has a low degree of graphitization known as hard carbons).

The low crystallinity carbon constituting of Carbon#1 has a sloppy voltage and a high medium voltage about 500 mV vs $Li^+/Li$. This high sloppy voltage will be affected on the decreasing of the energy density of the batteries. However this is compatible with PC based electrolyte. This type of electrolyte is suitable for low temperature applications.

The high crystallinity carbon constituting of Carbon#2 has a flat voltage and low medium voltage about 100 mV vs $Li^+/Li$. This low flat voltage will be affected on the increasing of the energy density of the batteries. However it is not compatible with PC based electrolyte.

EXAMPLES

The following examples are given for illustrative purpose only and may not be construed as consituting a limitation of the present invention.

Sample Preparation:

The following steps were used to prepare the proposed material:

1—Carbon#2 powder was dispersed in Liquid Phenolic Resin (PF) and the mixed using mixture ball milling. The mixing process was continued until complete dispersion of Carbon#2 in the PF and vaporization of 40-60wt % of the containing alcohol from PF, both were insured.

2—item-1 mixture was wed poured on flat Al-plate, then heated to 150-175° C. and thermally soaked for 2.0 hours. The heating rate could vary from 3 -8° C/min depending on the thickness of the sample, in our case heating of 5° C/min was used. After this heating process, the sample converts into solid sheets from which the AL-plate was separated.

3—item-3 Carbon#2: polymerized PF-matrix) heat treated to 600° C. and then to 1000 or 2500° C. using 30-50° C/min heating rate following thermal profile shown in FIG. 1.

The PF matrix polymerizes and pre-carbonizes up to 450-475° C. During this step, PF generates water, which vaporizes while heating. This leads to increasing density and decreasing volume. Between 500-600° C. PF begins the early stages of carbonization steps where the carbon graphite-sheets start buckling-up and building three-dimensional matrixes of randomly oriented short carbon layers with porous structure. PF porosity could depend on heat rate and thermal-soaking time in this temperature range. For longer heating time between 475-600° C. the PF pores size to become smaller. Above 600° C., the graphitization step starts and the graphite layer cross-link further. This process tends to squeeze the carbon#1 particles closer together and provides carbon-carbon composites with the low graphitized carbon matrix pressing over the highly graphitized carbon particles.

FIG. 7 shows Transmission Electron Micrograph of the carbon-carbon composite heat treated to 2.500° C. and as prepared according to sample 3 and 4.

The following Table 1 lists the data of carbon-carbon composite samples prepared for proof of the concept.

TABLE I

| No. | Sample Description | Pore Area (m²/g) | Ave. Dia. (μ) | Bulic Density (g/cm3) | Skeletal Density |
|---|---|---|---|---|---|
| 1 | 100 g PF 50 g-SPG-44 1000° C. | 9.184 ± 0.02 | 0.482 | 0.584 | 1.267 |
| 2 | 100 g PF 40 g-SFG-44/5% LiNO3 1000° C. | 13.193 ± 1 | 0.243 | 0.605 | 1.162 |
| 3 | 100 g PF 70 g-SFG-44 2500° C. | 3.198 ± 0.05 | 0.123 | 0.988 | 1.095 |
| 4 | 100 g PF 70 g-SFG-15 2500° C. | 6.550 ± 0.12 | 0.437 | 0.532 | 1.413 |

Carbon#1 is a carbon derived by heat treatment from 1.000 to 2.500 Celcius preferably at 1.000 degrees Celcius) from phenolic resin.

Carbon#2 is an artificial graphite—commercialized under the name SFG 44 (particles having a size of 44 micrometers) and under the name SFG 15 (particles having a size of 15 micrometers by the Company Timcal (anciently Lonza in Swiss).

Example 1

In this example the carbon-carbon composite was made by mixing 100 g PF with 50 g of SFG-44 (artificial graphite) commercialized by Timcal (Swiss) and heated at 1.000° C. for 2 hours in argon atmosphere. The SEM image of the carbon-carbon material of the sample 1 is shown in FIGS. 3A-B. The carbon#1 is derived from carbonization of PF, which cover partially the surface of carbon#2 (graphite). The electrochemical performance was obtained by using 1M $LiClO_4$ in EC-DMC as electrolyte. Three electrodes cell was used with lithium metal as counter electrode and reference. The reversible capacity of sample #1 is 218 mAh/g at C/12 rate (charge and discharge in 12 hours). The coulombic efficiency of the first cycle was 85%.

Example 2

Figure 4A:
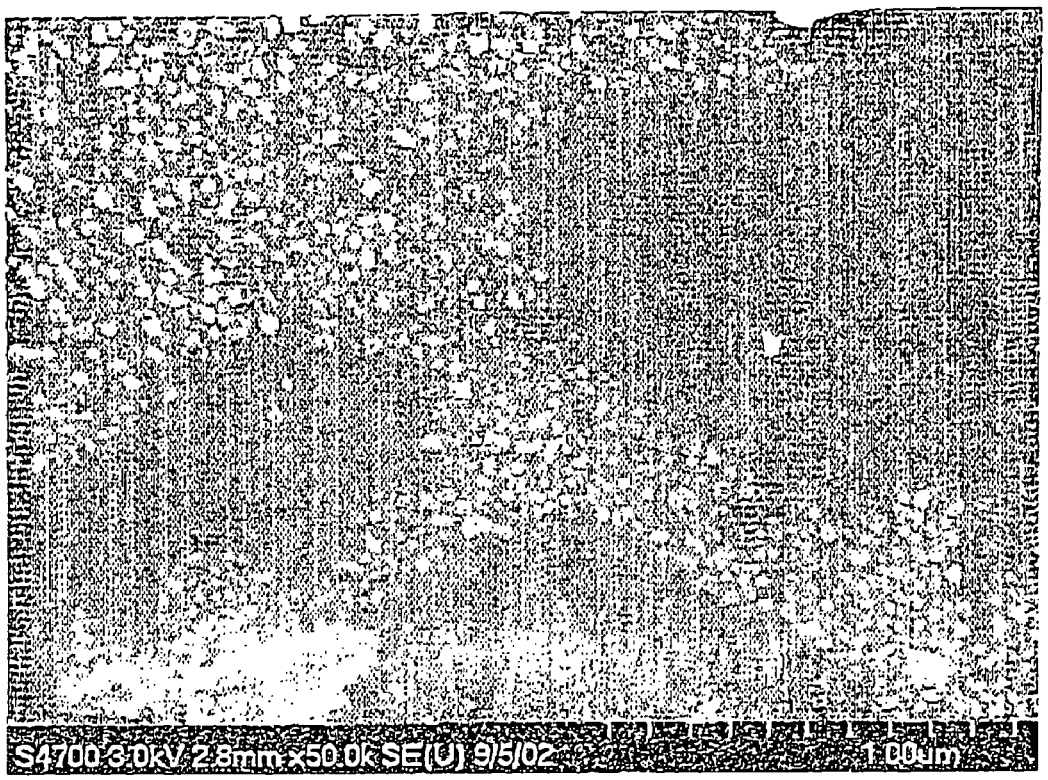
FIG. 4A is the SEM image of the carbon-carbon material according to sample 2 defined hereinafter in Table I, the carbon#1 is derived from carbonization of PF and covers almost totally the surface of carbon#2 (graphite); the measured particle size of carbon#1 is from 39 nm to 500 nm.
Figure 4B:
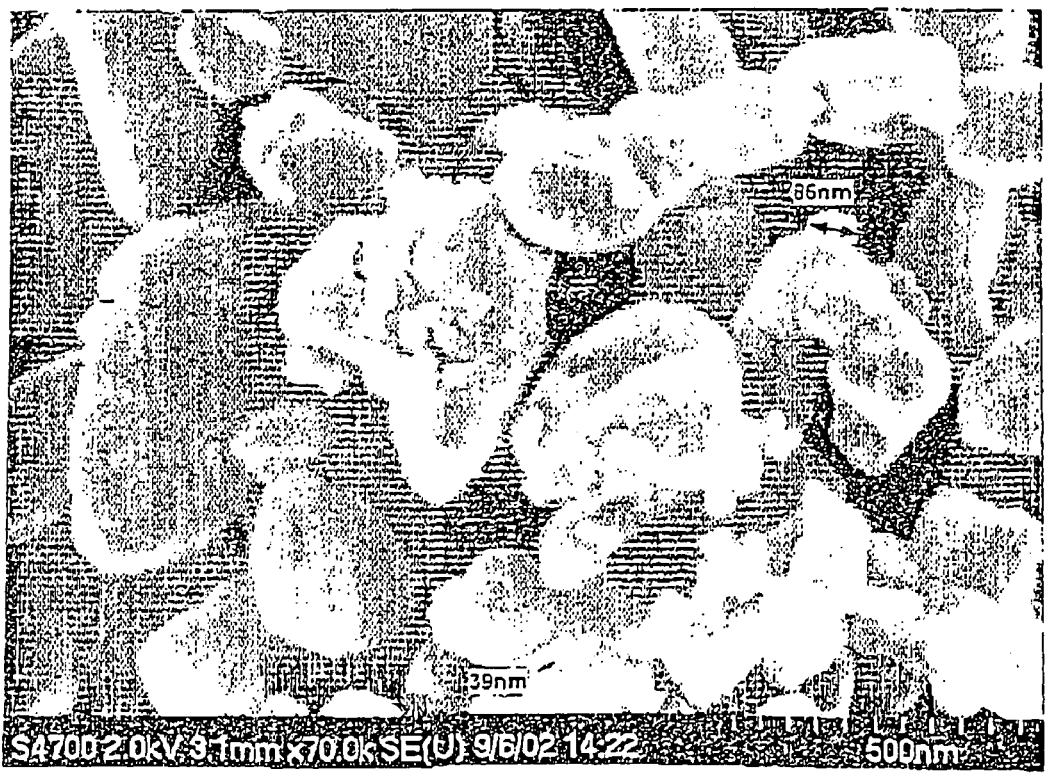
FIG. 4B is the same SEM image as in FIG. 4A, at a larger scale.

In this example the carbon-carbon composite was made by mixing 100 g PF with 40 g-SFG-44/5%LiNO3 and heated at 1000° C. for 2 hours in argon atmosphere. The SEM image of the carbon-carbon material of the sample 2 is shown in FIGS. 4A-4B. The carbon#1 is derived from carbonization of PF, which cover almost totally of the surface of carbon#2 (graphite). The particle size of carbon#1 is from 39 nm to 500 nm. The electrochemical performance was obtained by using 1M $LiClO_4$ in EC-DMC as electrolyte. Three electrodes cell was used with lithium metal as counter electrode and reference. The reversible capacity of sample #2 is 259 mAh/g at C/12 rate (charge and discharge in 12h). The coulombic efficiency of the first cycle was 82%.

Example 3

Figure 5A:
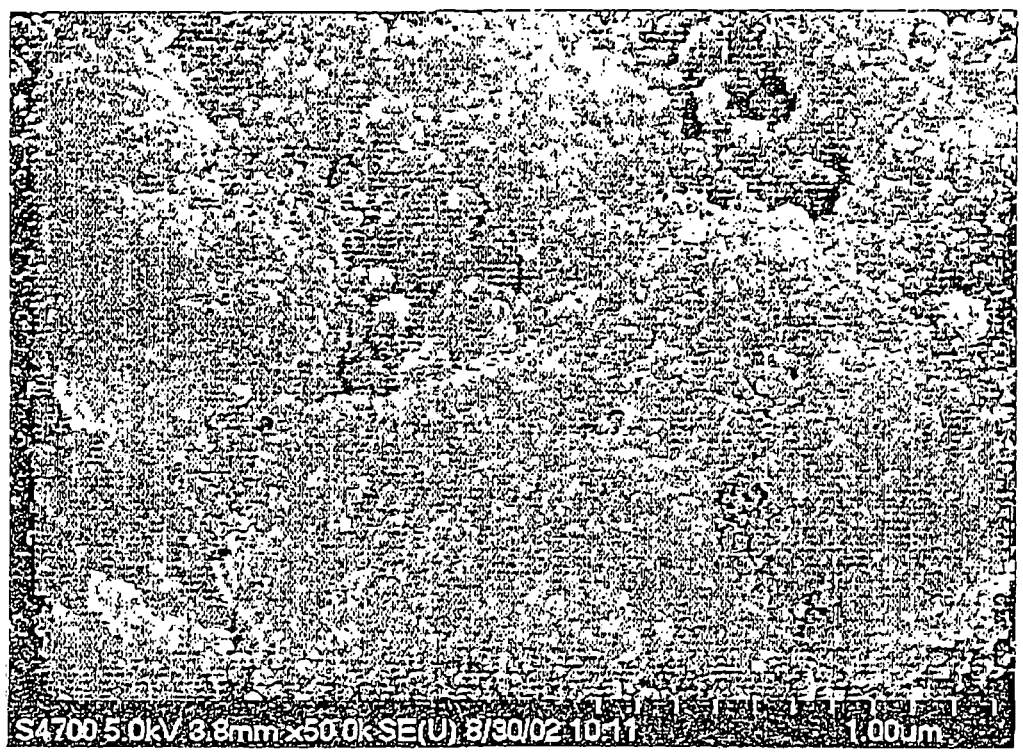
FIG. 5A is the SEM image of the carbon-carbon material according to sample 3 as defined hereinafter in Table I. The carbon#1 is derived from carbonization of PF, which covers partially the surface of carbon#2 (graphite), but still some graphite particles are not covered at all. The particle size of carbon#1 is from 20 nm to 500 nm.
Figure 5B:
FIG. 5B is the same image as in FIG. 5A but at a larger scale.

In this example the carbon-carbon composite was made by mixing 100 g PF with 70 g-SFG-15 and heated at 2500° C. for 1 minute in argon atmosphere. The SEM image of the carbon-carbon material of the sample 3 is shown in FIGS. 5A-B. The carbon#1 is derived from carbonization of PF, which cover partially the surface of carbon#2 (graphite), but still some graphite particle not covered at all. The particle size of carbon#1 is from 20 nm to 500 nm Example 4

Figure 6A:
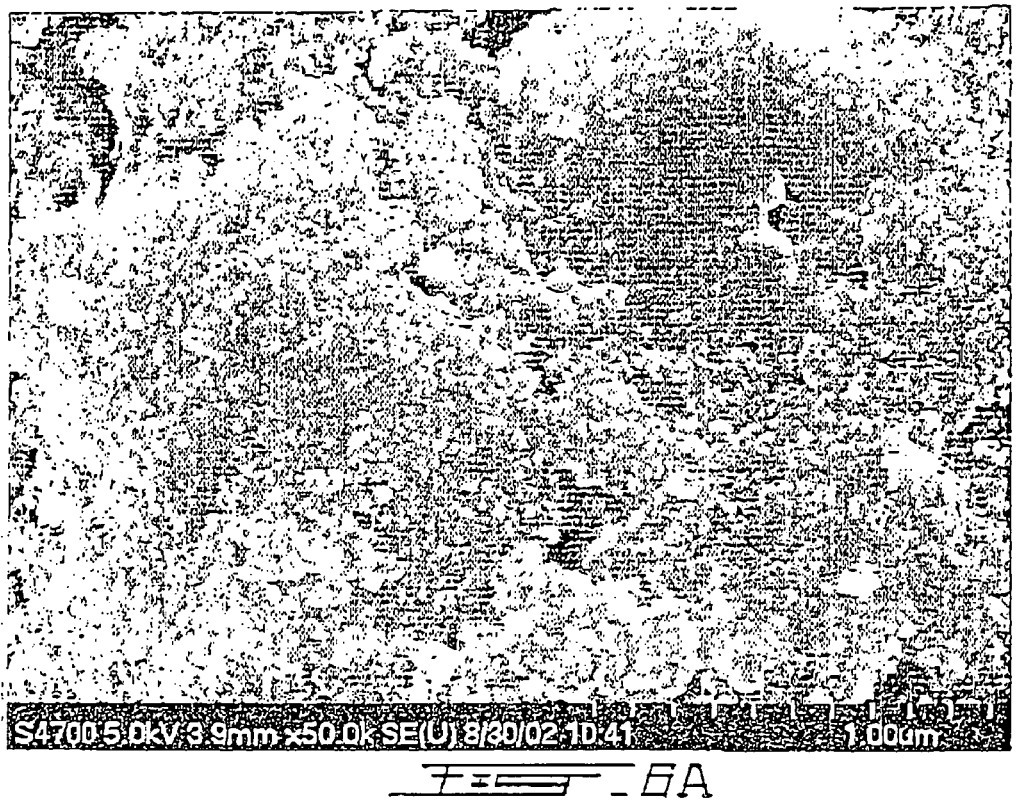
FIG. 6A is an SEM image of the carbon-carbon material according to sample 4 as defined hereinafter in Table I. The carbon#1 is derived from carbonization of PF, which covers almost totally the surface of carbon#2 (graphite). The carbon#1 is more compact and it's particle size is from 20 nm to 500 nm.
Figure 6B:
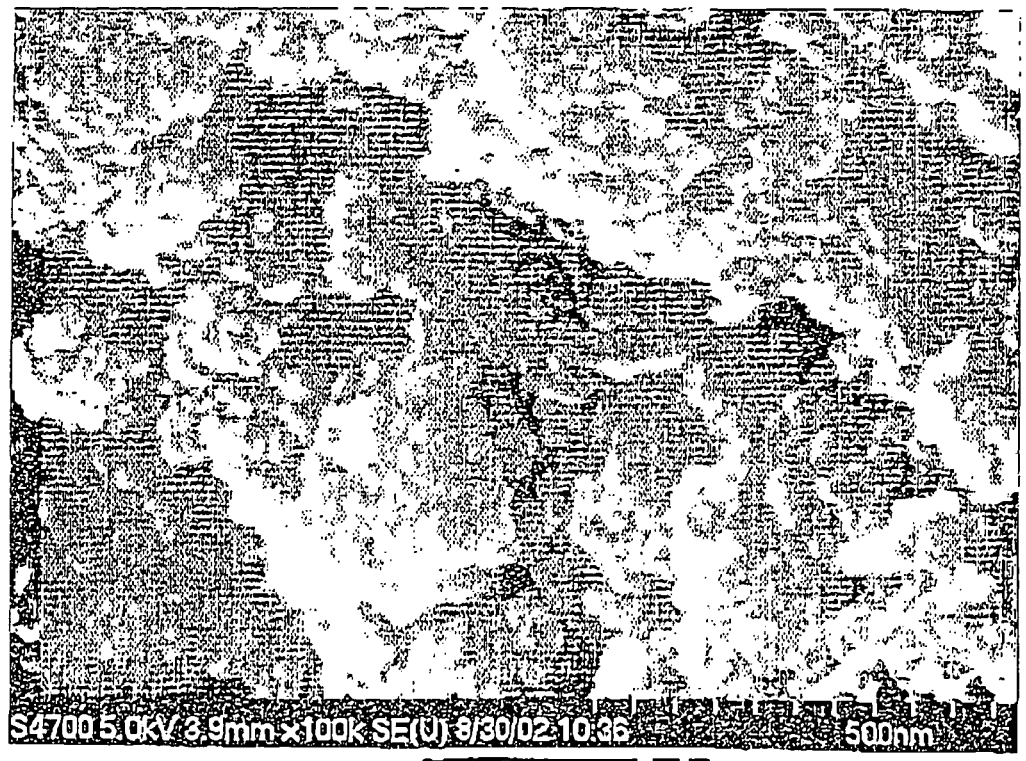
FIG. 6B is the same image as in FIG. 6A but at a larger scale.

In this example the carbon-carbon composite was made by mixing 100 g PF with 70 g-SFG-15 and heated at 2500° C. for 2 hours in argon atmosphere. The SEM image of the carbon-carbon material of the sample 3 is shown in FIGS. 6A-6B. The carbon#1 is derived from carbonization of PF, which cover almost totally the surface of carbon#1 (graphite). The carbon#1 is more compact, it's particle size is from 20 nm to 500 nm.

The electrochemical performance was obtained by using 1M $LiClO_4$ in EC-DMC as electrolyte. A three electrodes cell was used with lithium metal as counter electrode and reference. The reversible capacity of sample #4 is 280 mAh/g at C/12 rate (charge and discharge in 12 h). The coulombic efficiency of the first cycle was 56%

Among the improved properties of the new carbon-carbon material of the present invention over the known materials and particularly over the known NE materials are inter alia:
 the compatibility with propylene carbonate (PC);
 the low volume expansion;
 the high electrode density; and
 the low reactivity (safety).

It is to be understood that, while the foregoing invention has been described in detail by way of illustration and example, numerous modifications, substitutions, and alterations are possible without departing from the spirit and scope of the invention as described in the following claims.

The invention claimed is:

1. A composite of particles comprising a high crystallinity carbon and a low crystallinity carbon,
    the composite being obtained by a process comprising:
        dispersing and mixing the high crystallinity carbon in a polymeric substance form a mix; and
        subjecting the mix to a heat treatment at a temperature of at least 1200° C. to form a composite with high crystallinity carbon embedded within or surrounded by a matrix of polymer derived low crystallinity carbon;
    wherein:
        the low crystallinity carbon exhibits an average lattice constant d=(002) of 0.350 nm or more and a crystallite size L=(002) in the diffraction of C axis of 25 nm or less, as characterized by wide-angle X ray diffraction measurements;
        the high crystallinity carbon exhibits an average lattice constant d=(002) of 0.338 nm or less and a crystallinity size L=(002) in the diffraction of C axis of 40 nm or more, as characterized by wide-angle X-ray diffraction measurements;
        the high crystallinity carbon having at least 50% of its external surface embedded within or surrounded by a matrix of low crystallinity carbon; and
        the high crystallinity carbon forms particles having a particle size ranging from 1 to 50 micrometers, the high crystallinity carbon particles being at least partially covered by particles of low crystallinity carbon having a particle size ranging from 10 to 500 nm, the low crystallinity carbon particles being attached to the surface of the high crystallinity carbon particles.

2. A composite of particles according to claim 1, wherein the high crystallinity carbon is selected in the group consisting of graphite, kish graphite, pyrolytic graphite, gas-growth graphite and any artificial graphite.

3. A composite of particles according to claim 1, wherein the high crystallinity carbon is a natural graphite.

4. A composite of particles according claim 1, wherein the package density of said particles, measured according to the tap density method associated to the apparatus commercialized under the name Logan Instrument Corp. Model Tap-2, is superior or equal to 0.5 g/cc.

5. A composite of particles according to claim 1, wherein the particle size of said particles, measured according to the SEM method, associated to the apparatus Microtrac model X100 Particle Analyser, ranges from 0.5 to 100 micrometers.

6. A composite of particles according to claim 1, having according to the BET method, a specific surface area ranging from 1 to 50 $m^2/g$.

7. A composite of particles according to claim 1, wherein at least 70% of the external surface of the high crystallinity carbon is embedded or surrounded by a matrix of low crystallinity carbon.

8. A composite of particles according to claim 1, having a size measured according to the SEM (Scanning Electron Microscopy) method ranging from 1 to 50 micrometers.

9. A composite of particles according to claim 1, having a size measured according to the SEM (Scanning Electron Microscopy) method ranging from 12 to 20 micrometers.

* * * * *